United States Patent
Helava

[11] 3,881,802
[45] May 6, 1975

[54] WEDGE-PRISM OPTICAL SCANNER
[75] Inventor: Uuno V. Helava, Southfield, Mich.
[73] Assignee: The Bendix Corporation, Southfield, Mich.
[22] Filed: Apr. 18, 1974
[21] Appl. No.: 461,823

[52] U.S. Cl. .................. 350/6; 350/285; 350/287
[51] Int. Cl. .......................................... G02b 17/00
[58] Field of Search ........... 350/6, 7, 285, 286, 287; 178/7.6

[56] References Cited
UNITED STATES PATENTS
| | | | |
|---|---|---|---|
| 1,647,631 | 11/1927 | Ives | 350/6 |
| 1,818,410 | 8/1931 | Leventhal | 350/6 |
| 3,704,949 | 12/1972 | Thomas et al. | 350/6 |

—Ronald L. Wibert
*Assistant Examiner*—J. Henry
*Attorney, Agent, or Firm*—James R. Ignatowski

[57] ABSTRACT

A wedge-prism optical scanner embodying a single rotating wedge and a roof prism optically arranged to reflect an incident beam of light to pass through the wedge twice is disclosed. The retro-reflective property of the roof prism along one of its axes causes the two deflections produced by the rotating wedge to be cancelled, while the specular reflective property of the roof prism along a transverse axis causes the two deflections produced by the wedge to add. Rotation of the prism rotates the retro-reflective and specular reflective axis of the prism and rotates the scan plane of the optical scanner. Individual and integrated encoding systems generating signals indicative of the angle of the deflection and the rotation of the scan plane are also disclosed.

21 Claims, 10 Drawing Figures

WEDGE-PRISM OPTICAL SCANNER

FIELD OF THE INVENTION

The invention is related to the field of optics and in particular to the field of optical scanners deflecting a light beam along a linear path.

BACKGROUND OF THE INVENTION

Various optical devices for deflecting a beam of light to scan along a desired path are known in the art. These devices may range from a simple mirror or refractive element rotating about an axis perpendicular to the desired scan direction to other more sophisticated systems using counter rotating wedges or even acousto-optical and electro-optical deflection devices. All of these optical scan devices have their place in the field of optics and are well suited for particular applications. The counter-rotating wedge scanner, in particular, has found wide acceptance in the optics field for precision line scanning instruments where the angle of deflection, and therefore, the position of the beam must be accurately known.

One of the problems associated with the counter-rotating wedge beam scanner is the requirement that the wedges must be simultaneously rotated in the opposite direction in perfect unison. Obviously, mechanical differences or errors in the driving mechanisms of a counter-rotating wedge will result in deflection error. Although in many practical applications this error may be negligible in other applications, it is desirable or even necessary to eliminate this error. The error in a counter-rotating wedge scanner is of the order of $(1-\cos \alpha)$ where $\alpha$ is the rotational error in the relative position of the two wedges from the desired position caused by the differences in the mechanical drives. It turns out this error can be eliminated by the disclosed wedge prism scanner using an optical configuration that requires only one rotating wedge and removes the mechanical complications of driving two wedges in perfect unison.

The primary object of the invention is a precision optical scanner eliminating the mechanical problems and associated errors of counter-rotating wedge optical scanners. A further objective of the invention is an optical scanner having a single rotating wedge and a reflective element, wherein the reflective element retro-reflects a light beam component along one axis and specularly reflects a light beam component along an axis transverse to the retro-reflective axis. A still further object is an emobdiment of the optical scanner having a single rotating wedge and a roof prism. Another objective is an optical scanner in which the plane of the scan deflection can be rotated by moving only one element in the scanner. A final objective of the invention is a precision optical scanner having a single rotating wedge generating signals indicative of the deflection angle and the rotational position of the scan plane.

SUMMARY OF THE INVENTION

The invention is an optical line scanner embodying only one rotating wedge. The scanner comprises a single rotating optical wedge and a reflective element disposed behind the wedge to reflect the incident light beam back through the single rotating wedge, so that it will be twice deflected by the wedge.

The reflective element has the property of retro-reflecting the component of the incident light beam along one of its axes and specularly reflecting the component of the incident light beam along an axis transverse to the retro-reflective axis. The reflective element may be a roof prism or a pair of planar reflective surfaces disposed at 90° to each other. Other types of multiple reflective elements may also be used. The rotating wedge initially deflects an incident light beam through a determinable angle and the direction of the deflected light beam rotates with the rotation of the wedge imparting to the deflected beam varying angular components with reference to the axes of the reflective element. The deflected component lying along one of the axes of the reflective element is retro-reflected back through the deflecting wedge where it is deflected a second time in the same direction, however, the beams are traveling in the reverse direction, and the deflections along this axis cancel. The deflected components lying along the other axis of the reflective element is specularly reflected back through the deflecting wedge where it is deflected a second time. This second deflection doubles the deflection of the beam along the specularly reflecting axis of the reflective element. The combined effect of the wedge and reflective element produces a double deflection of the component of the incident light beam along one axis of the reflective element while the component of the incident light beam deflected along the retro-reflective axis of the reflective element are cancelled. Means such as a beam splitter are provided to separate the deflected light beam from the incident light beam after the second pass through the wedge. One advantageous facet of the invention is that the direction of the deflected light beam exiting the disclosed scanner is determined by the orientation of the reflective element and may be rotated to any desired angular position by simply rotating the reflective element about an axis concentric with the rotational axis of the wedge. The scanner is also amenable to encoding both the angular position of the rotating wedge and the angular position of the reflective element to generate signals indicative of the deflection angle and the rotational plane of the deflected light beam.

DETAILED DESCRIPTION OF THE PREFERRED EMBODIMENT

Figure 1:
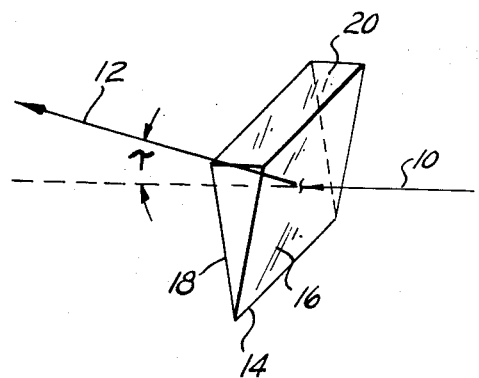
FIG. 1 is a drawing illustrating the deflection characteristics of an optical wedge.
Figure 2:
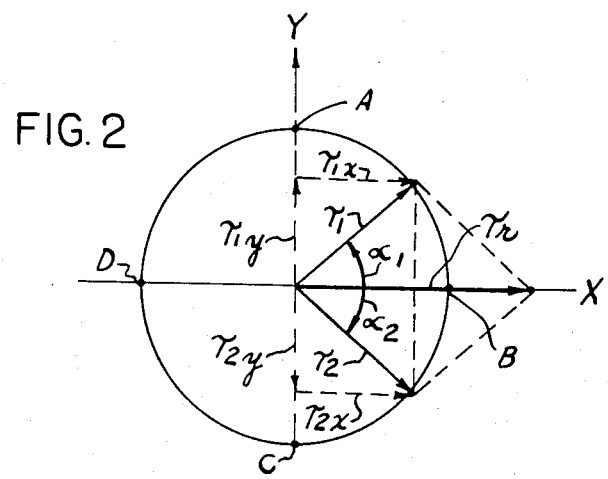
FIG. 2 is a vector representation of the deflection produced by a counter-rotating optical scanner.

The principles of the counter-rotating wedges for line scanning with a beam of light are well known in the art, and a variety of devices using this principle are commonly employed in commercially available instruments. A nonobvious, but valid, way of describing the function of the counter-rotating wedge scanner is shown in FIGS. 1 and 2. Referring to FIG. 1 a light beam, indicated by arrow 10, is incident on a transparent optical wedge 20, and by well known optical principles is angularly deflected and emerges from the wedge along a path 12 at an angle $\tau$ with respect to its original direction. The deflection of the light beam is in a direction perpendicular to the apex of the wedge 14 formed at the intersection of the two planar surfaces 16 and 18 as shown. When the wedge is rotated about an axis passing through surfaces 16 and 18 and perpendicular to a plane containing the apex 14, the magnitude of the deflection $\tau$ is a constant; however, the direction of the deflection $\tau$ which is always perpendicular to the apex 14 rotates with the wedge. Therefore, the angular deflection $\tau$ may be considered as a rotating vector $\tau$ of constant amplitude.

Referring to FIG. 2, a counter-rotating wedge scanner is depicted as generating two angular deflection vectors $\tau_1$ and $\tau_2$ of equal magnitude rotating in opposite directions at the same rate. $\tau_1$ is the rotating vector of the first wedge and $\tau_2$ is the rotating vector of the other wedge. The resultant vector $\tau_r$ is the sum of two vectors $\tau_1$ and $\tau_2$. During each 360° of counter-rotation, two vectors $\tau_1$ and $\tau_2$ align with each other at four positions designated as A, B, C, and D. At the two positions designated as A and C, the directions of the two vectors $\tau_1$ and $\tau_2$ will be equal and opposite so that their resultant vector $\tau_r$ is zero and there is no deflection. At the other two positions B and D disposed 90° either way from points A and C the directions of the two vectors $\tau_1$ and $\tau_2$ are the same and the two vectors add and the resultant vector $\tau_r$ is twice the value of either vector $\tau_1$ or $\tau_2$.

A line drawn through points A and C is designated as the Y axis and a line drawn through B and D is designated as the X axis. At any intermediate point, the vectors $\tau_1$ and $\tau_2$ may be broken down as the resultant of two mutually perpendicular component vectors, one component vector along the Y axis and the other component vector along the X axis as indicated by dashed vectors $\tau_{1y}$ and $\tau_{1x}$, respectively, and similarly $\tau_2$ can be broken down into component vectors $\tau_{2y}$ and $\tau_{2x}$.

Consider two wedges 1 and 2 starting at point B where $\tau_1$ and $\tau_2$ are additively aligned and after a period of time each rotates through an angle $\alpha$. Wedge 1 rotates in a counter-clockwise direction through an angle $\alpha_1$ and wedge 2 rotates in a clockwise direction $\alpha_2$. Since both wedges rotate at the same rate, $\alpha_1 = -\alpha_2$.

From purely geometrical considerations, the angular deflection components $\tau_{1y} = -\tau_{2y}$. Therefore, the result of adding the $y$ deflection components of the two deflection vectors $\tau_1$ and $\tau_2$ as the wedges rotate, is always zero. Therefore, there is never any deflection in the $y$ direction, as long as the two wedges counter rotate in perfect unison. The only deflection produced is the vector sum of $\tau_{1x}$ and $\tau_{2x}$ which is along the $x$ axis. In this manner the counter-rotating wedges will only deflect the light beam in a plane defined by the incident beam and the $x$ axis.

In a counter-rotating wedge scanner, the primary function of the second wedge is to produce a $\tau_{2y}$ deflection component equal and opposite to the $\tau_{1y}$ deflection component of the first wedge effectively cancelling the deflection of the beam along the $y$ axis.

Figure 3:
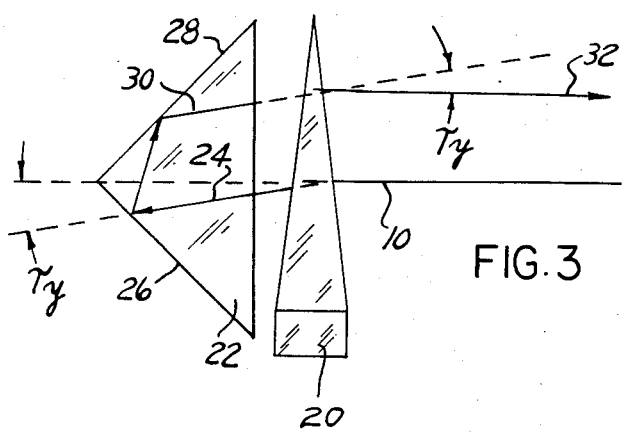
FIG. 3 is a drawing illustrating the deflection characteristics of a wedge-prism scanner along the Y axis of a roof prism reflective element.

This cancellation of the $y$ component of the deflection beam can be achieved using a single rotating wedge 20 and a roof prism 22 having a 90° corner angle as shown in FIG. 3. A single wedge 20 is shown in a rotational attitude with respect to the prism indicative of position between B and C of FIG. 2, but may be in any other position having a $\tau_y$ component. The incident beam 10 passes through the wedge 20 and is deflected by the wedge so that it emerges at an angle $\tau$ having a deflected component $\tau_y$. The $\tau_y$ component of the deflected beam 24 is reflected by the surfaces 26 and 28 respectively forming the 90° corner of the roof prism and emerges from roof prism at the same angle as it entered the prism. The changes in the angle of the beam entering and emerging from the roof prism due to refraction of the transparent material of the prism are understood but not shown. It is equally understood and within the scope of the invention that the roof prism may be replaced by two planar reflective surfaces disposed at an angle of 90° with respect to each other and have the same positional relationship to the wedge as surfaces 26 and 28 of the roof prism.

The retro-reflective characteristic of two surfaces disposed at 90° with respect to each other, such as surfaces 26 and 28 of the roof prism is well known and need not be discussed in detail for an understanding of the invention.

The retro-reflected beam 30 emerging from the roof prism is incident on the reverse side of the wedge 20 and is again deflected through an angle $\tau_y$. The deflection is in the same rotational direction but the light beam has reversed its direction. Therefore, the twice deflected and twice reflected $y$ component of the light beam 32 emerges from the wedge in a plane parallel to incident light beam 10 in the $y$ direction. The two deflections of the $y$ component are equal and produce the same result obtained with the counter-rotating wedge scanner.

Figure 4:
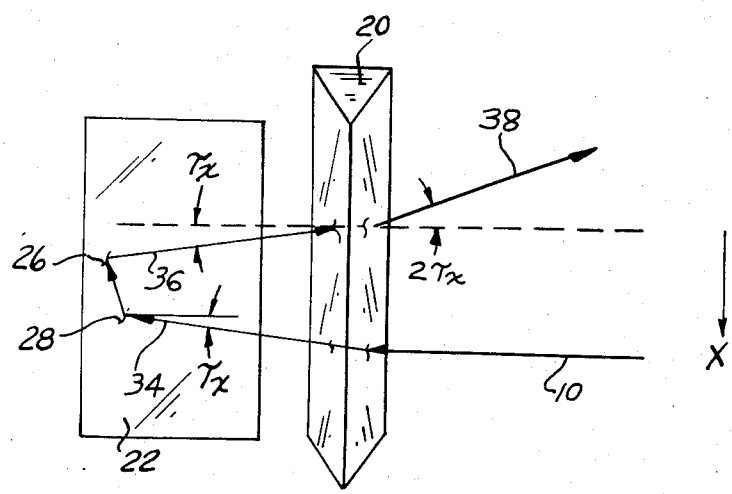
FIG. 4 is a drawing illustrating the deflection characteristics of a wedge-prism scanner along the X axis of a roof prism reflective element.

FIG. 4 illustrates the path of the $x$ component of the beam 10 illustrated in FIG. 3. The beam 10 enters the wedge 20 and is deflected through the same angle $\tau$ having a deflected component $\tau_x$ in the direction of the $x$ axis. The deflected $x$ component of the beam 34 is reflected by the roof forming surfaces 26 and 28 of the prism and exits the prism at an angle $\tau_x$ the same as if the beam had been specularly reflected from a plane surface mirror. The specularly reflected light beam 36 leaving the prism is again deflected by the wedge through the angle $\tau$ having an $x$ component $\tau_x$ and emerges from the wedge at an angle having an $x$ component equal to $2\tau_x$. In this manner, the wedge-prism combination functions in the same way as the counter-rotating wedges, with the roof prism being determinative of the direction in which the beam is deflected. The deflection plane is defined by the direction of the incident light beam and the apex of the roof defined by the intersection of surfaces 26 and 28.

Figure 5:
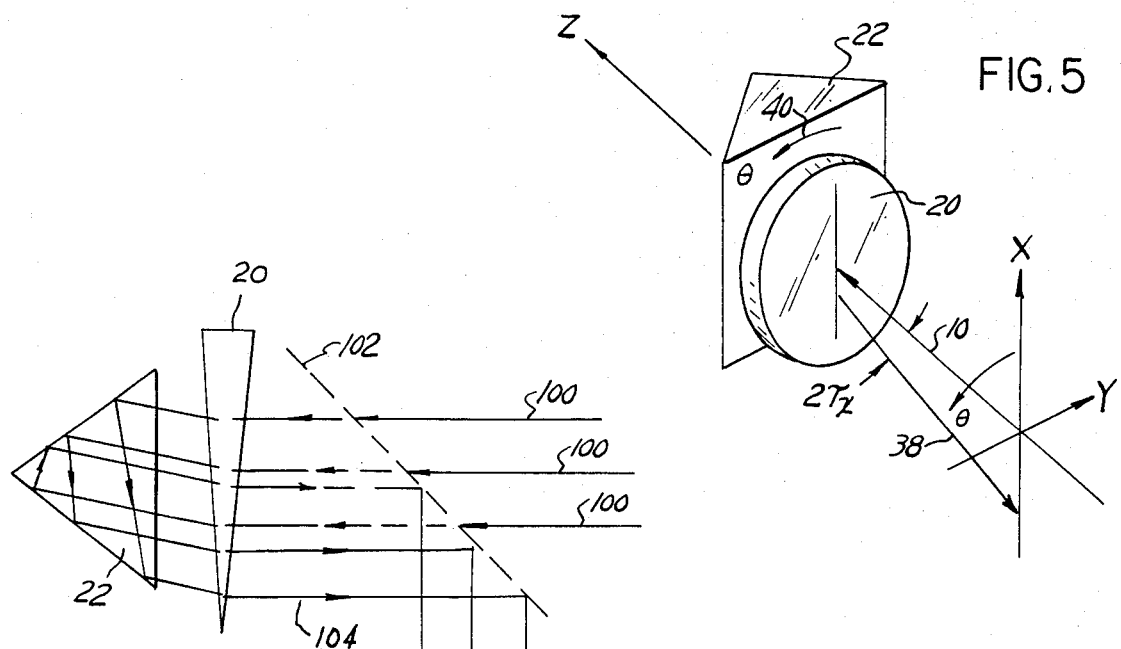
FIG. 5 is a drawing illustrating the rotation of the deflection plane with the rotation of the roof prism.

The retro-reflective and spectural reflective characteristics of the roof prism which defines the deflection plane imparts a further advantage to the wedge-prism scanner. The deflection of the disclosed wedge-prism scanner as indicated above are directly associated with the rotational position of the roof prism and the deflection is limited to a plane containing the apex of the prism's roof. Therefore, rotating the prism about a z axis which is mutually perpendicular to both the x and y axis of the prism will rotate the plane in which the beam is deflected. Because the scanner is otherwise symmetrical, it is possible to make the scan direction variable by designing the system such that the roof prism is rotatable about the z axis of the scanner. Therefore, the disclosed wedge-prism scanner can operate in two dimensions using a polar coordinate system as shown in FIG. 5. The rotating wedge-prism scanner has a single rotating wedge 20 rotating symmetrically about the z axis. As discussed with reference to FIGS. 3 and 4 input beam 10 will pass through the wedge-prism scanner and exit having a deflection component along the x axis only as shown by beam 38. As the wedge rotates relative to the prism, the deflection $2\tau_x$ along the x axis will vary as a function of the rotational position of the wedge, having a maximum deflection when the apex of the wedge is perpendicular to the apex prism's roof, and no deflection when the apex of the wedge is parallel to the roof's edge.

Rotating the prism counter-clockwise through an angle $\theta$ as shown by arrow 40 will also rotate the mutually perpendicular X–Y coordinates of the deflected light beam an equal amount.

Figure 6:
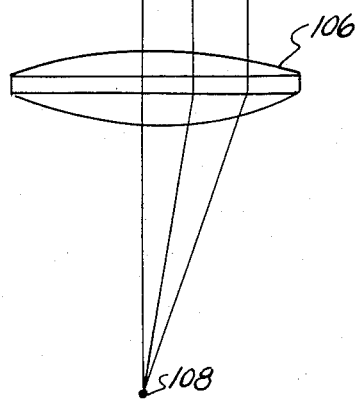
FIG. 6 is a drawing of the wedge-prism scanner with a beam splitter separating the deflected beam from the incident beam of light.

In a practical system application it is often necessary to separate the emerging output beam from the input beam. One way this may be accomplished is shown in FIG. 6. The input beam indicated by arrows 100 is incident on a beam splitter 102 which may be a half-silvered mirror, a pellicle, or any other type of beam splitter known in the art. A portion of the incident light beam is transmitted through the beam splitter to the wedge-prism scanner consisting of rotating wedge 20 and roof prism 22. The transmitted beam is deflected by the wedge then reflected by the roof prism back through the wedge onto the reverse side of the beam splitter. The beam splitter 102 then reflects the deflected beam 104 along a path displaced from the input beam 100. By means of an appropriate lens 106, the beam may be focused to a point 108 which defines a scan line perpendicular to the surface of the draing. This type of system has many practical applications but may be wasteful of the available light because of the light losses in dual reflection by the beam splitter.

Figure 7:
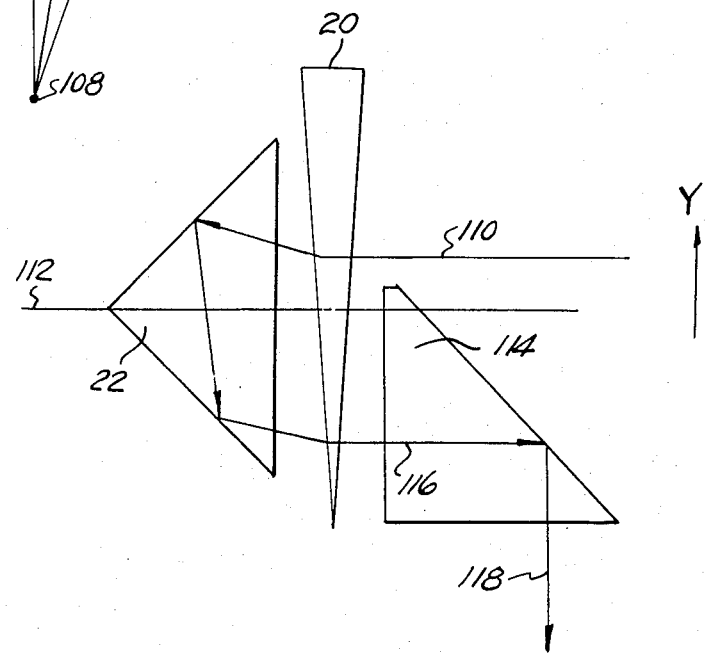
FIG. 7 is a drawing of the wedge-prism scanner with a prism separating the deflected beam from the incident beam of light.

It would be obvious to a person skilled in the art that when using a light source generating a narrow beam of light, such as a laser, the configuration shown in FIG. 7 may be applicable. A narrow beam of light 110 is incident upon the wedge prism scanner comprising rotating wedge 20 and roof prism 22 at a point offset from the center of the prism defined by line 112 passing through the prism's apex in the Y direction. The amount of offset will be a function of various parameters such as the maximum deviation produced by the wedge and the size of the roof prism. The retroreflection by the two reflecting surfaces of the roof prism 22 will displace the beam along the y axis so that it exits the prism on the opposite side of the centerline 112. A reflective surface such as a mirror or prism 114 disposed to receive the light exiting the wedge will reflect the deflected beam 116 along a path 118 different from the path of the incident light beam 110. Of course a lens such as 106 of FIG. 6 may be used to focus the deflected light beam to scan along a line such as 108.

Although two ways have been shown to separate the incident and deflected beams, it is recognized that other means for separating the two beams are known and would be obvious to a person skilled in the art in any given application.

In many scanning applications, it is required that the position of the deflected beam be accurately known. In counter-rotating wedge systems, it is customary to place a coded pattern about the periphery of the rotating wedge, or attaching an encoder having a coded pattern to the rotating wedge support. The rotational position of the wedge is then read out by detecting the coded pattern with a sensor. In other applications requiring higher positional accuracies, a high speed encoder may be used in conjunction with the above-described type of encoder, to increment the coded signals and produce signals with higher positional accuracies. Various other types of encoder systems are known in the art and are directly applicable to the disclosed wedge-prism scanner for generating signals indicative of the angle of the deflected beam. In addition to encoding the position of the wedge, it is also possible to independently encode the rotational position of the prism in the same or similar way.

Figure 8:
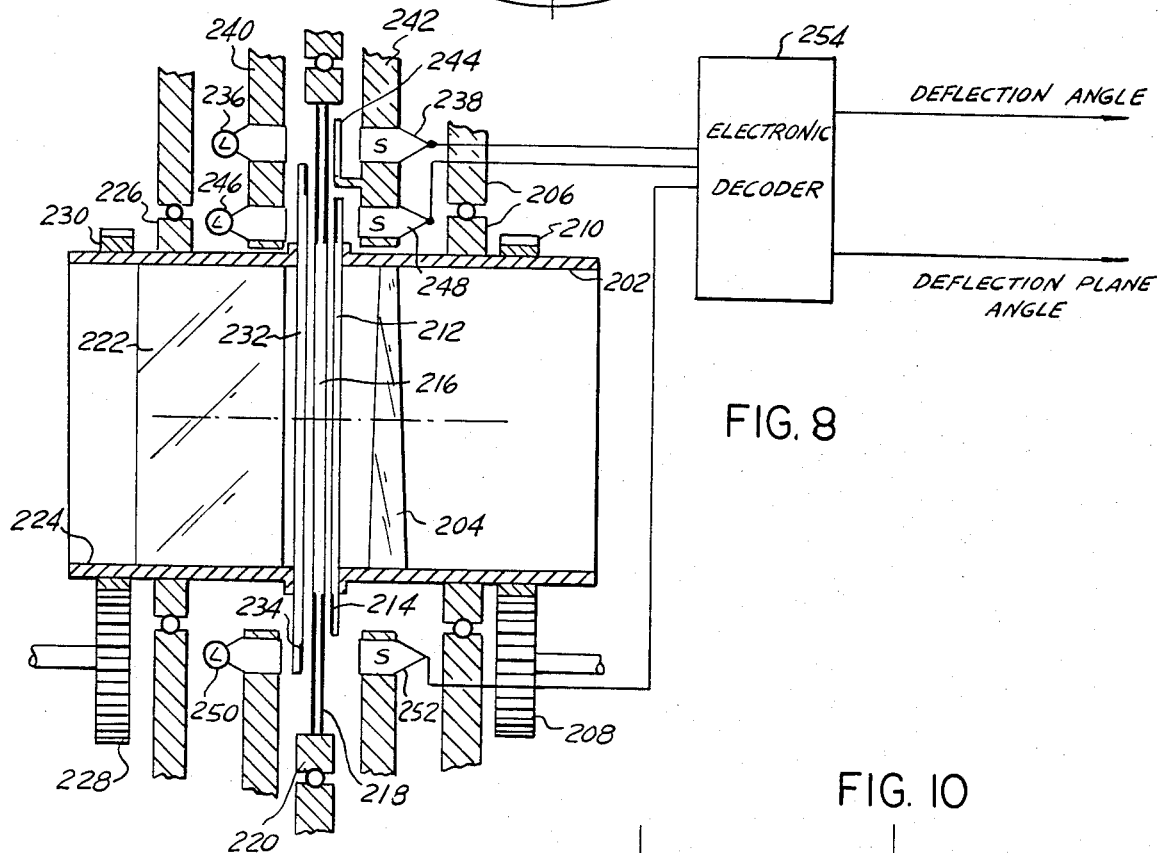
FIG. 8 is a drawing illustrating an embodiment of the wedge-prism scanner having an integrated positional encoding system.

The integrated encoding system shown in FIG. 8 may be used for determining the rotational position of the wedge and the prism using a single fast rotating encoder disc in conjunction with the individual encoders rotating with the wedge and prism respectively. The system comprises a wedge housing 202 rigidly holding wedge 204 rotationally mounted from a support structure (not shown) by means of a bearing 206. The wedge housing is driven by a gear 208 engaging a mating ring gear 210 fixedly attached to the wedge housing. A transparent wedge position encoder disc 212 having an encoded pattern 214 about its periphery is fixedly attached to the wedge housing 202 and rotates therewith. Adjacent to the wedge position disc 212 is a fast rotating encoder disc 216 having a transparent central area and fast rotating encoded pattern 218 about its periphery. The fast rotating encoder disc 216 is rotatably mounted by means of bearing 220 and is driven by means not shown at a rate faster than the rotational speed of the wedge holder. The roof prism 222 is supported in the prism housing 224, rotatably supported by bearing 226, and driven by gear 228 engaging mating ring gear 230 attached to the prism housing 224. Attached to the end of the prism housing on the end adjacent to the fast rotating encoder 216 and rotatable therewith is a transparent prism position encoder disc 232 having an encoded pattern 234 about its periphery.

A light source 236 and a sensor 238 are fixedly attached to stationary support members 240 and 242 respectively on opposite sides of the fast rotating encoding pattern 218 outside the periphery of either the prism encoder pattern 234 or the wedge encoder pattern 214. A stationary pattern 244 fixedly attached to support member 242 is disposed between the fast rotating encoder pattern 218 and the sensor 238. The combination of the light source 236 encoder pattern 218, stationary pattern 244 and sensor 238 generate a reference signal indicative of the rotational speed of the fast rotating encoder pattern.

A second light source 246 and a second sensor 248 are fixedly attached to the stationary supports 240 and 242 respectively and are disposed to generate a signal of the relative rotational position of the fast rotating encoder pattern 218 and the wedge encoder pattern 214. It is obvious that rotation of the wedge encoder pattern 214 will increment the generated signal by modulating the phase of the signal produced by the fast rotating encoder pattern 218 and the detector 248 will generate a signal having a frequency different from the reference signal produced by detector 238.

Figure 9:
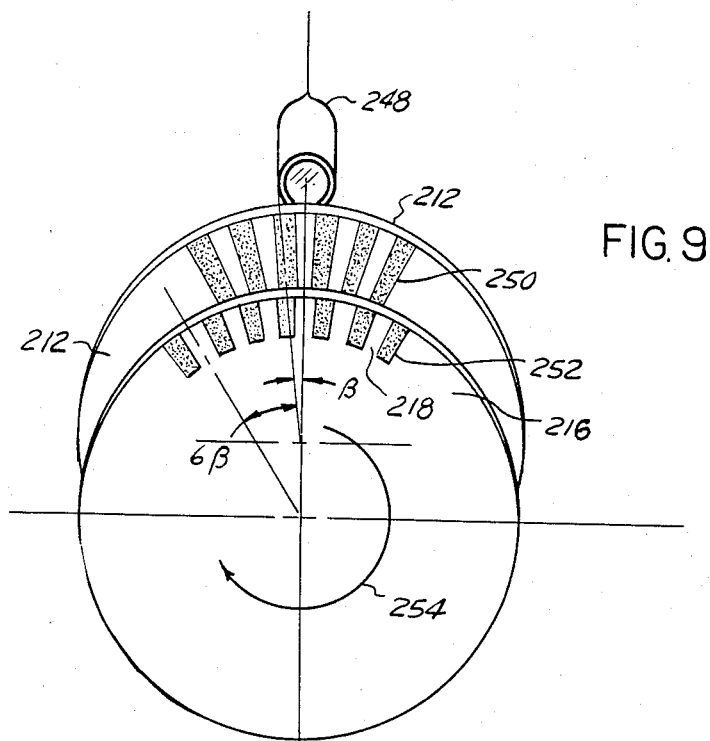
FIG. 9 is a perspective showing the relationship between the fast rotating and wedge encoders to generate incremental positional output signals.
Figure 10:
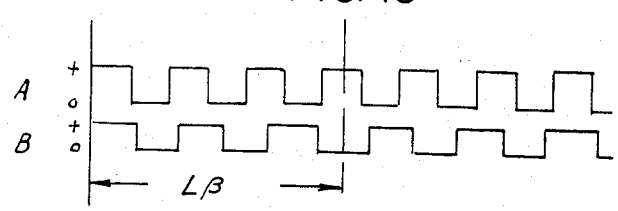
FIG. 10 is a waveform diagram showing the phase shift between the reference signal and the composite signal generated by the integrated encoder system.

This may be better understood by referring to FIGS. 9 and 10. FIG. 9 shows two identical coder patterns 214 and 218 having radial bars 250 and 252 about the peripheries of encoder discs 212 and 216 respectively. The fast rotating encoder disc is for example rotating six times as fast as wedge encoder discs 212 in the direction shown by arrow 254; therefore, each time encoder pattern 214 rotates through an angle to sufficiently move an adjacent code bar in front of detector 248, six code bars from pattern 218 are passed in front of detector 248. The signal produced by the reference detector 238 is shown as waveform A on FIG. 10 while the signal produced by detector 248 is shown as waveform B on FIG. 10. When disc 212 has rotated through an angle $\beta$, ( $\angle \beta$) equal to one-half the displacement between opaque bars placing an opaque pattern 252 in front of the detector 248, disc 216 has rotated through an angle $6\beta$ placing a transparent space 256 in front of the detector. At this point while the output of detector 238 is maximum, the encoder patterns are out of phase and the output of detector 248 is zero. It is obvious that after disc 216 rotates through a second angle $\beta$ the two discs are back in phase. This change in phase can be detected using conventional electronic circuitry 254 and the rotational position of the wedge disc accurately determined by counting the number of phase reversals and determining the phase relationship between the reference signal and the wedge signal. Of course it is recognized that the fast rotating encoder may rotate at a rate much faster than the six to one rate given in the example. Other types of coding patterns and electronic circuitry to generate positional signals from the coded signals are known in the art which are equally applicable to the disclosed wedge prism scanner.

Referring back to FIG. 8, a light source 250 and a detector 252 are disposed on supports 240 and 242 respectively and generates a composite signal produced by the prism encoder pattern 234 and fast rotating coder pattern 218 in a manner identical to that discussed with reference to light source 246 and 248 generating a composite signal from wedge encoder pattern 214 and fast rotating encoder pattern 218.

With this arrangement, it is possible to share a common fast rotating encoder for incrementally encoding both the wedge and the prism positions from which the deflection angle of the beam and the deflection plane can be accurately computed by the electronic decoder 254.

Although the wedge-prism scanner is disclosed and discussed with reference to particular embodiments, the illustrated embodiments are not intended to limit the scope of the invention.

What is claimed is:

1. An optical scanner for angularly deflecting an incident beam of light in a direction parallel to a determinable plane comprising:
    a single refractive member, having an entrance surface, an exit surface angularly disposed to said entrance surface and a longitudinal axis passing through said entrance and exit surfaces, for angularly deflecting the incident beam of light incident on said entrance surface in a straight line through said single refractive member to said exit surface in a direction to generate a deflected beam angularly disposed to the direction of said incident beam, said deflected beam having a first angular component in a direction parallel to a first predetermined plane containing said longitudinal axis and a second angular component in a direction parallel to a second predetermined plane containing said longitudinal axis and perpendicular to said first predetermined plane;
    means for rotating said single refractive member about said longitudinal axis;
    means disposed adjacent to said exit surface for reflecting said deflected beam back through said single refractive member, said means for reflecting retro-reflecting said first angular component and specularly reflecting said second angular component.

2. The optical scanner of claim 1 further means disposed adjacent to the entrance surface of said single refractive member along said longitudinal axis for optically separating said deflected light beam from said incident light beam after passing through said single refractive member a second time.

3. The optical scanner of claim 2 wherein said single refractive member is a transparent substrate having an index of refraction different from the surrounding media, wherein said entrance surface and said exit surface are two planar surfaces of said substrate angularly disposed to each other to form a wedge, and said longitudinal axis passes through both of said two planar surfaces.

4. The optical scanner of claim 2 wherein said means for reflecting comprises two planar reflective surfaces intersecting along a common line perpendicular to the longitudinal axis of said single refractive member, one of said reflective surfaces disposed at a 45° angle with respect to said longitudinal axis and the other reflective surface disposed on the opposite side of said longitudinal axis and at an angle of 90° with respect to said one reflective surface.

5. The optical scanner of claim 4 wherein said means for reflecting is a roof prism having an entrance surface disposed normal to the longitudinal axis and two planar surfaces disposed at right angles to each other and at an angle of 45° with respect to the entrance surface to form a roof, said two planar surfaces comprising said planar reflective surfaces.

6. The optical scanner of claim 4 wherein said optical scanner further includes means for rotating said means for reflecting about said longitudinal axis.

7. The optical scanner of claim 2 further including means detecting the rotational position of said single refractive member for generating a signal indicative of the angular deflection of the deflected light beam.

8. The optical scanner of claim 7 wherein said means for generating a signal comprises:

an encoder attached to said single refractive member, said encoder having a code pattern indicative of the rotational position of the encoder;

means detecting the code pattern on the encoder for generating a signal indicative of the rotational position of said refractive member; and means, receiving said positional signals, for generating signals indicative of the angular deflection of said light beam.

9. The optical scanner of claim 6 further including means for generating a signal indicative of the rotational position of said reflection means and therefore the angular orientation of the determinable plane in which the light beam is deflected.

10. The optical scanner of claim 9 further including means for generating a signal indicative of the angular deflection of the light beam from the rotational position of the refractive member.

11. The optical scanner of claim 10 further including a fast rotating encoder cooperating with said means for generating signals indicative of the deflection of said light beam, and said means for generating signals indicative of the rotational position of said means for reflecting, for incrementing the individual signals generated to produce signals with greater positional accuracy.

12. A single wedge optical scanner for angularly deflecting an incident light beam in a direction parallel to a determinable plane comprising:

a base;

a transparent wedge to angularly deflect an incident beam of light, said optical wedge having two planar surfaces angularly disposed relative to each other and having an axis of rotation passing through both planar surfaces, said wedge rotatably supported from said base and adapted to rotate about said axis of rotation;

means for rotating said wedge about said axis of rotation relative to said base; and an optical reflector supported from said base and disposed adjacent to one of said two planar surfaces said optical reflector having two intersecting reflective planar surfaces forming the inside of a 90° roof structure having an apex defined by the intersection of said two reflective surfaces, the apex of said roof structure being disposed perpendicular to the axis of rotation with said two reflective surfaces symmetrically positioned about said axis of rotation and the inside of said roof structure facing the wedge.

13. The single wedge scanner of claim 12 wherein said optical reflector is a roof prism.

14. The single wedge scanner of claim 12 further including a beam splitter supported from said base and disposed adjacent to the second of said two planar surfaces.

15. The single wedge scanner of claim 12 further including an encoder means for generating an electrical signal indicative of the deflection of said incident light beam from the rotational position of said wedge.

16. The single wedge scanner of claim 13 further including means for rotating said optical reflector about an axis concentric with axis of rotation of said wedge.

17. The single wedge scanner of claim 15 further including second encoder means for generating a signal indicative of the rotational position of said optical reflector.

18. A wedge-prism scanner for angularly deflecting an incident beam of light in a direction parallel to a predetermined plane comprising:

a transparent wedge having an input surface receiving the incident beam of light and an exit surface emitting said incident beam of light and having an axis of rotation passing through said input and exit surfaces, to angularly deflect the incident beam of light to follow a path having a predetermined direction with respect to said incident beam of light;

means for rotating said optical wedge about said axis of rotation; and a roof prism having two mutually perpendicular planar internal reflective surfaces and an apex formed by the intersection of said internal reflecting surfaces, said roof prism disposed adjacent to the exit surface of said optical wedge with said apex normal to the axis of rotation of said wedge and said internal reflective surfaces facing said wedge to reflect said light beam back through said wedge.

19. The wedge-prism scanner of claim 17 further including means for generating signals indicative of the deflection of said light beam from the rotational position of said wedge.

20. The wedge-prism scanner of claim 18 further including means for separating the light beam emerging from said wedge after being reflected by said roof prism, from said incident beam of light.

21. The wedge-prism scanner of claim 19 further including:

means for rotating said roof prism about the axis of rotation of said wedge; and means for generating a signal indicative of the rotational position of said roof prism.

* * * * *

UNITED STATES PATENT OFFICE
CERTIFICATE OF CORRECTION

PATENT NO. : 3,881,802
DATED : May 6, 1975
INVENTOR(S) : Uuno V. Helava

It is certified that error appears in the above-identified patent and that said Letters Patent are hereby corrected as shown below:

Col. 9, line 31, delete the word "optical".

Signed and Sealed this eighth Day of June 1976

[SEAL]

Attest:

RUTH C. MASON
Attesting Officer

C. MARSHALL DANN
Commissioner of Patents and Trademarks